P. PAULSON.
DEVICE FOR STOPPING RUNAWAY HORSES.
APPLICATION FILED SEPT. 22, 1915.
1,201,091.
Patented Oct. 10, 1916.
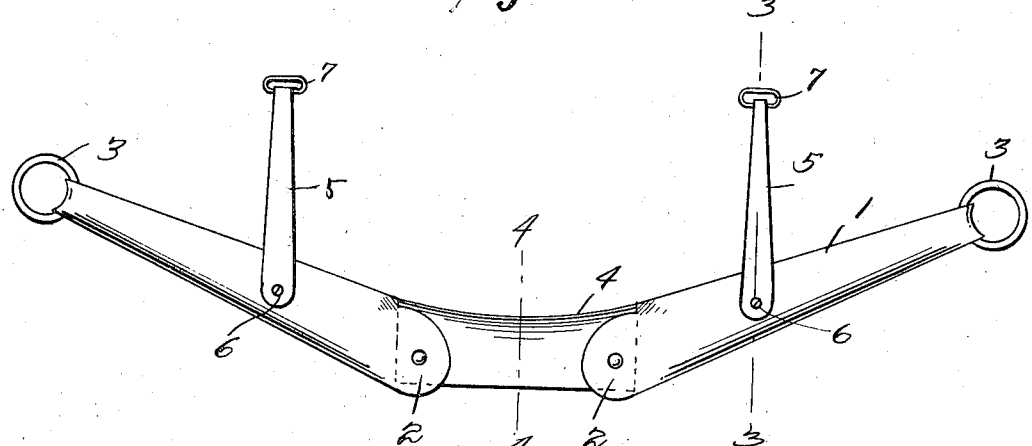
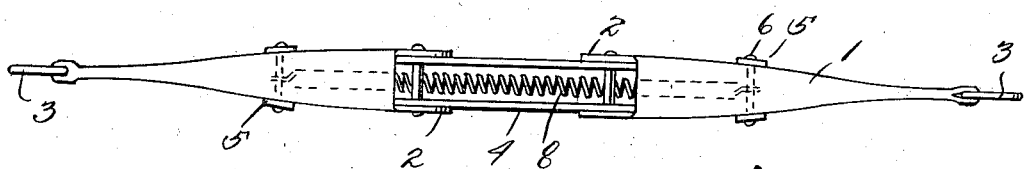
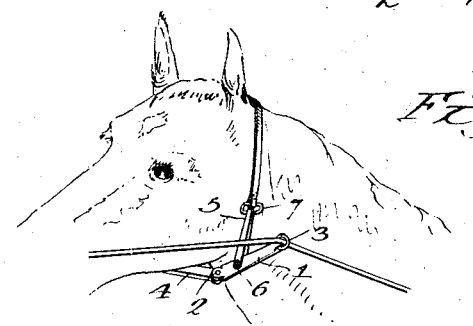
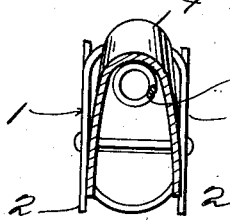
Inventor
P. Paulson
Witnesses
By
Attorneys

UNITED STATES PATENT OFFICE.

PAUL PAULSON, OF FLAMING, MINNESOTA.

DEVICE FOR STOPPING RUNAWAY HORSES.

1,201,091.  Specification of Letters Patent.  Patented Oct. 10, 1916.

Application filed September 22, 1915. Serial No. 52,081.

*To all whom it may concern:*

Be it known that I, PAUL PAULSON, a citizen of the United States, residing at Flaming, in the county of Norman, State of Minnesota, have invented certain new and useful Improvements in Devices for Stopping Runaway Horses; and I do hereby declare the following to be a full, clear, and exact description of the invention, such as will enable others skilled in the art to which it appertains to make and use the same.

The present invention is directed to improvements in devices for stopping runaway horses, and has for its object to so construct a device of this character that the same can be easily and quickly applied to the usual harness bridle.

A further object of the invention is to provide a device of this character so constructed that should the animal attempt to run away, a pull on the reins will actuate the device to choke the animal, thus bringing the animal to a stop.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a front view. Fig. 3 is a sectional view on line 3—3 of Fig. 1. Fig. 4 is a similar view on line 4—4 of Fig. 1. Fig. 5 is a view of the device showing the same in use.

The device comprises a pair of sheet metal arms 1, which are U-shaped in cross section, and have their inner ends provided with spaced ears 2, while their outer ends are provided with rings 3, the purpose of which will appear later. A throat bar 4 is provided and is also formed from sheet metal, and is U-shaped in cross section, the opening thereof being directed downwardly, while the openings of the arms 1 are directed upwardly. The throat bar 4 has its ends pivotally connected between the ears 2. Hangers 5 are provided and have their lower ends engaged with the screws 6, which pass through the arms 1, while the upper ends of said hangers are provided with rings 7 for engagement with the cheek straps of the bridle. Located in the channels of the arms 1 and bar 4 is a coil spring 8, said spring having its ends connected to the screws 6, said spring serving to return the bar 4 to its normal or inoperative position after use. The reins are passed through the rings 3, and it will be obvious that should the horse start to run away, the driver will pull upon the reins, thus rocking the arms 1 on the pivot screws 6, which action causes the throat bar 4 to move upwardly and engage the throat of the animal with sufficient pressure to cut off the wind, thus causing the animal to stop. As soon as strain is relieved on the reins, the spring 8 will cause the bar 4 to move downwardly, thus disengaging the throat of the animal.

What is claimed is:—

A device of the class described, comprising a pair of hangers adapted to be attached to a bridle, a pair of arms pivotally supported by the hangers and being U-shaped in cross section, said arms having their inner ends provided with ears, a throat bar having its ends pivotally connected to said ears, said throat bar being U-shaped in cross section and having its channel in registry with the channels of the arms, the open sides of the arms and throat bar being disposed oppositely, and a coil spring engaged in the registered channels and having its ends connected to the pivotal connection of the hangers, as and for the purpose set forth.

In testimony whereof, I affix my signature, in the presence of two witnesses.

PAUL PAULSON.

Witnesses:
 HANS PAULSEND,
 CAROLINE PEDERSEN.